United States Patent
Fujita et al.

[11] Patent Number: 5,609,243
[45] Date of Patent: Mar. 11, 1997

[54] TOOTHED CONVEYING BELT

[75] Inventors: Yoshihisa Fujita, Nishi-ku; Takahide Mizuno, Hyogo-ku; Hiroyuki Nishio, Tarumi-ku; Kuniharu Uto; Kazutoshi Ishida, both of Kobe, all of Japan

[73] Assignee: Mitsuboshi Belting Ltd., Nagata, Japan

[21] Appl. No.: 578,092

[22] Filed: Dec. 27, 1995

[30] Foreign Application Priority Data

Dec. 28, 1994 [JP] Japan ................... 6-340263

[51] Int. Cl.⁶ .................................. B65G 15/34
[52] U.S. Cl. .................................. 198/847
[58] Field of Search ............. 198/847; 474/205, 474/263; 156/137, 138

[56] References Cited

U.S. PATENT DOCUMENTS

| | | | |
|---|---|---|---|
| 3,666,085 | 5/1972 | Folkes | 198/847 |
| 3,736,805 | 6/1973 | Dent | 198/847 X |
| 3,853,016 | 12/1974 | Lane, III et al. | 198/847 X |
| 4,302,197 | 11/1981 | Kimura et al. | 198/847 X |
| 4,533,040 | 8/1985 | Howerton | 198/847 |
| 4,533,420 | 8/1985 | Wetzel | 198/847 X |
| 4,957,199 | 9/1990 | Wokke et al. | 198/847 |
| 5,141,101 | 8/1992 | Vance et al. | 198/847 |
| 5,167,771 | 12/1992 | Sayers et al. | 198/847 X |

*Primary Examiner*—James R. Bidwell
*Attorney, Agent, or Firm*—Wood, Phillips, VanSanten, Clark & Mortimer

[57] ABSTRACT

A toothed belt having a body with a length, laterally spaced sides, an inside and an outside, and defining a plurality of teeth spaced in a lengthwise direction on one of the inside and the outside of the body. The body is defined at least in part by a rubber composition made up of at least an ethylene propylene diene monomer (EPDM) and a diene rubber. A cloth layer is provided on the teeth on the one of the inside and the outside of the body. The cloth layer is treated with a resorcin-formalin-latex solution.

28 Claims, 1 Drawing Sheet

U.S. Patent     Mar. 11, 1997     5,609,243

TOOTHED CONVEYING BELT

BACKGROUND OF THE INVENTION

1. Field of the Invention

This invention relates to endless, toothed belts, and, more particularly, to a toothed belt used to frictionally convey flat objects, such as paper money, cards, tickets, and the like.

2. Background Art

A prior art system for conveying thin articles, such as paper money, cards, tickets, etc. is shown at 10 in FIG. 1. The conveying system 10 includes cooperating, endless, toothed belts 12, 14, each having a similar construction. The belt 12 is trained around spaced drive and driven pulleys 16, 18, respectively, which pulleys 16, 18 have parallel rotational axes 20, 22. The belt 14 is trained around drive and driven pulleys 24, 26, which pulleys 24, 26 are rotatable about axes 28, 30, that are parallel to each other and the axes 20, 22 associated with the belt 12. The drive pulley 16 rotates in the direction of the arrow 32, with the drive pulley 24 rotating in the direction of the arrow 33.

The belts 12, 14 are arranged so that outside conveying surfaces 34, 36 on the belts 12, 14 are in contact over a substantial length thereof at the region 38. An article 40 to be conveyed, which article 40 may be paper money, cards, tickets, or the like, is advanced between the belts 12, 14 in the direction of the arrow 42. The article 40 is frictionally driven by the belt surfaces 34, 36 from right to left in FIG. 1 with the belts 12, 14 advancing as previously described. Spaced pressing rollers 44, 46 are selectively movable downwardly in FIG. 1 against the inside of the belt 12 at the region 38 to thereby deform and press the belt 12 towards backing rollers 48, 50, aligned with the pressing rollers 44, 46 and acting against the belt 14, to vary the pressing force between the belt surfaces 34, 36 at the region 38.

Ideally, the coefficient of friction between the article 40 and belt surfaces 34, 36 remains relatively constant through significant temperature variations, preferably in the range of −20° C. to 60° C. Still further, it is desirable that the flexibility and wear resistance of the belts 12, 14 do not significantly change with the belts 12, 14 operating within this temperature range. It is also important that the belts 12, 14 do not stain the articles 40 which are conveyed thereby.

It is known to construct toothed belts, such as those 12, 14, disclosed in FIG. 1, using chloroprene rubber. These belts have a plurality of regularly spaced teeth on an inside surface and an outside part within which load carrying cords are embedded.

It is also known to place a cloth covering over the surface of the teeth on this type of belt. One known cloth layer has a warp and a weft with the weft being defined by crimped 6 nylon or 6,6 nylon. The warp is an uncrimped thread of 6 nylon or 6,6 nylon, preferably with the same composition as the weft.

It is also known to enhance the adherence of the cloth to the belt teeth by using an adhesion treatment with a resorcin-formalin-latex solution (RFL). This solution is applied to the rubber using a soaking or a spreading treatment process.

Even when a chloroprene rubber which does not readily crystallize at low temperatures is used, when the chloroprene rubber is used alone, a decrease in the frictional coefficient between the belt and the articles to be conveyed may result at low temperatures. To compensate for this, the gripping force between the belts 12, 14 has been increased by deforming the belt through the pressing rollers 44, 46.

By urging the pressing rollers 44, 46 against the belt 12, the tension thereon increases. As a result, the surfaces 34, 36 become more prone to wear. Further, load carrying cords within the belt 12 tend to stretch. Adjustment of the belt tension through change in the spacing between the pulleys 16, 18 may then be necessary, possibly on a frequent basis. To accommodate this adjustment, the pulleys and supporting structure therefor have to be made strong and durable, which potentially increases the complexity and the cost of the overall system.

Another problem with conventional, toothed conveying belts is that the rubber underlying the cloth coveting layer is commonly exposed through openings defined between the warp and weft of the cloth layer. The pulleys 16, 18, 24, 26 may directly contact the rubber on the belts 12, 14 through these openings, and as a result abrade the rubber to produce rubber dust particles. This rubber dust may migrate between the belts 12, 14 in the region 38 and may contact and stain the articles 40 that are conveyed.

SUMMARY OF THE INVENTION

One object of the present invention is to maintain an acceptable coefficient of friction between an article to be conveyed and the inventive conveying belt through a wide temperature range without the need to deform, and apply excessive forces to, the belt, as through a pressing roller. Ideally, an acceptable coefficient of friction and flexibility are maintained through the temperature range anticipated in the environment in which the belt is used. Another object of the invention is to minimize abrasion of the belt rubber resulting from direct contact between pulleys, that drive or are driven by the inventive belt, as would cause dislodging of rubber dust as might contact and stain articles as they are conveyed. Another object of the invention is to provide a conveying belt with good ozone resistance and which conveys articles effectively even when the articles have deposits of oil water thereon. Some or all of these objectives may be achieved using the inventive structure, described below.

In one form of the invention, a toothed belt is provided having a body with a length, laterally spaced sides, an inside and an outside, and defining a plurality of teeth spaced in a lengthwise direction on one of the inside and the outside of the body. The body is defined at least in part by a rubber composition made up of at least an ethylene propylene diene monomer (EPDM) and a diene rubber. A cloth layer is provided on the teeth on the one of the inside and the outside of the body. The cloth layer is treated with a resorcin-formalin-latex solution.

This rubber composition has demonstrated the ability to maintain a relatively constant coefficient of friction between the belt and paper articles conveyed thereby through a substantial temperature range.

The invention also contemplates the toothed belt in combination with a pulley to engage the teeth. The one of the inside and outside of the body may be defined by rubber, with the cloth layer preventing direct contact between the pulley and the rubber on the one of the inside and the outside of the body.

By substantially preventing direct contact between pulleys and the rubber in the teeth, abrasion, as might break loose rubber dust, is minimized. Consequently, the quantity of rubber dust that might contact the conveyed articles is reduced to an acceptable level to thereby minimize staining of the conveying articles.

In one form, the cloth layer is treated with only a resorcin-formalin-latex solution.

A plurality of load carrying cords may be embedded in the body.

In one form, the body has an outside part in which the load carrying cords are embedded and the outside part and teeth both are made at least partially from the above rubber composition.

The invention further contemplates the toothed belt in combination with a second toothed belt of similar construction. The two belts are each mounted for movement in endless paths wherein the other of the inside and outside of the bodies on the two belts are in close proximity to frictionally convey a flat object therebetween.

In one form, the rubber composition includes ethylidene norbornane, with the EPDM having an iodine value of at least 10, and more preferably 15, and still more preferably 20.

The diene rubber may be at least one of a) natural rubber, b) BR (butadiene rubber), c) SBR (styrene butadiene rubber), d) NBR (nitrile rubber), e) HNBR (hydrogenated nitrile rubber), and f) chloroprene rubber.

The rubber composition may be formed using a compounding agent that is at least one of a) carbon black b) zinc white, c) stearic acid, d) a plasticizer, and e) an antioxidant.

The rubber composition may be formed using a vulcanizing agent that is at least one of sulfur and an organic peroxide.

The rubber composition may include 20–70 weight parts of EPDM, and more preferably 25–50 weight parts of EPDM.

The cloth layer may have 30–50 weight percent of solid resorcin-formalin-latex solution.

In one form, the cloth layer is defined by at least one of a) 6 nylon, b) 6,6 nylon, c) polyester, and d) aramid fiber.

The cloth layer has a warp and a weft, and in one form both the warp and weft are defined by at least one of a filament thread and a spun thread.

The weft may be defined by at least one of woolie nylon thread and urethane elastic thread.

The cloth layer may be one of a plain weave, twill weave, and satin weave.

In one form, the load carrying cords are defined by filaments of 5–9 µm diameter of at least one of E glass and high strength glass treated with a protective agent.

The protective agent may be at least one of a rubber composition and an RFL solution.

The load carrying cords may alternatively be twisted 0.5–2.5 denier filaments of para aramid fiber treated with an adhesive defined by at least one of a) an RFL solution, b) an epoxy solution, and c) an isocyanate solution with a rubber composition.

In another form of the invention, a toothed belt is provided having a body with a length, laterally spaced sides, an inside and an outside, and defining a plurality of teeth spaced in a lengthwise direction on one of the inside and the outside of the body. The body is defined at least in part by a rubber composition made up of a) ethylene propylene diene monomer (EPDM), b) a diene rubber that includes at least one of i) natural rubber, ii) BR (butadiene rubber), iii) SBR (styrene butadiene rubber), iv) NBR (nitrile rubber), v) HNBR (hydrogenated nitrile rubber) and vi) chloroprene rubber, and c) ethylidene norbornane. A cloth layer is provided on the teeth on the one of the inside and outside of the body.

DETAILED DESCRIPTION OF THE DRAWINGS

Figure 1:
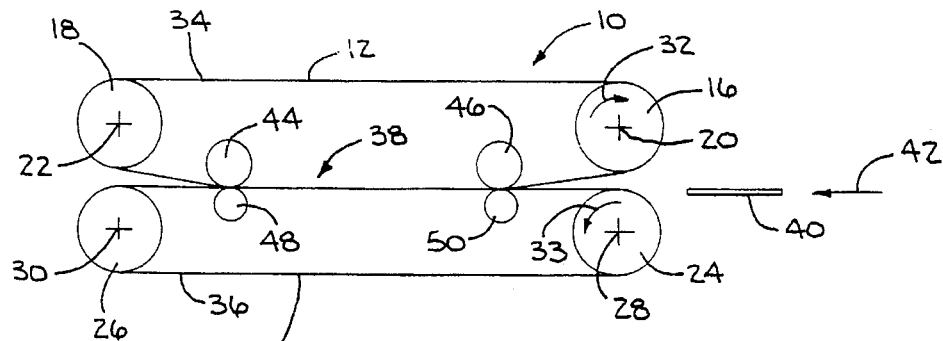
FIG. 1 is a schematic, side elevation view of a prior art system used to convey flat articles through the use of a cooperating pair of toothed, endless conveying belts.
Figure 2:
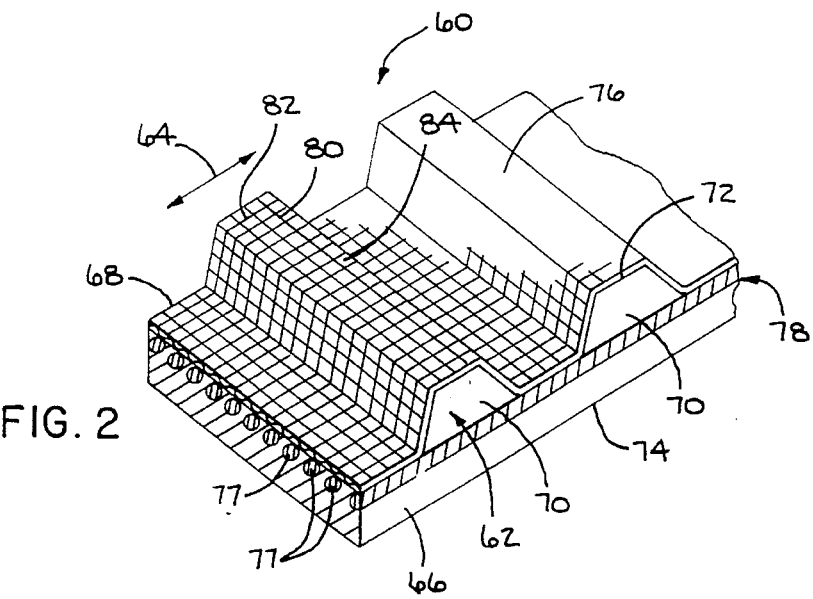
FIG. 2 is a fragmentary, perspective view of a toothed belt, according to the present invention, useable in a system such as that shown in FIG. 1.

In FIG. 2, a toothed conveying belt, according to the present invention, is shown at 60. The conveying belt 60 is useable as one of two cooperating belts in a system such as that 10 shown in FIG. 1, described in the Background Art section, above. The belt 60 has a body 62 extending in a lengthwise direction, as identified by the arrow 64. The body 62 has laterally spaced sides 66, 68 and a plurality of teeth 70 spaced regularly along the length of the body 62 on the inside thereof. The body 62 has an inside surface 72 and an outside, conveying surface 74, which surface 74 engages the articles 40 to be advanced. The inside surface 72 is covered with a cloth layer 76. For longitudinal reinforcement, a plurality of load carrying cords 77 are embedded in an outside part 78 of the body 62.

A rubber composition defines the belt teeth 70 and the outside belt part 78. The rubber composition is made up of at least an ethylene propylene diene monomer (EPDM) and a diene rubber. Preferably, the EPDM is present in the composition in an amount of 20–70 weight parts, and more preferably 25–50 weight parts.

It has been found that when the EPDM is present in an amount less than 20 weight parts, the resistance of the rubber composition to ozone is detrimentally reduced. When the amount of EPDM exceeds 70 weight parts, the adherence of the rubber composition to the cloth layer 76 and the load carrying cords 77 is detrimentally diminished. The wear resistance of the rubber composition also diminishes as a result of which the belt life may be significantly reduced.

In a preferred form, the iodine value in the EPDM is at least 10, and preferably over 15, and more preferably over 20.

In a preferred form, it is desirable to co-vulcanize with the diene rubber a third component that is ethylidene norbornane. Ethylidene norbornane has a high vulcanizing rate.

The diene rubber in the rubber composition is at least one of natural rubber, BR (butadiene rubber), SBR (styrene butadiene rubber), NBR (nitrile rubber), HNBR (hydrogenated nitrile rubber) having unsaturated parts, chloroprene rubber, and the like. In one preferred form, the rubber composition is made by blending three types of rubber—a) EPDM, b) SBR and c) one of NR or BR. More preferably, the rubber composition is made by blending EPDM, SBR and BR.

A compounding agent may be used in the rubber composition, which compounding agent may be at least one of carbon black, zinc white, stearic acid, a plasticizer, an antioxidant, and the like. Vulcanizing agents, such as sulfur and an organic peroxide may also be used. The above examples of the compounding agents and vulcanizing agents should not be viewed as limiting.

Load carrying cords 77 may be made by twisting together 5–9 µm diameter bundled filaments of E glass or a high strength glass and treating the bundled filaments with a protective agent. The protective agent may be a rubber composition or RFL solution, which is an adhesive, or the like.

Alternatively, a cord 77 can be made by twisting together and treating 0.5–2.5 denier filaments of para aramid fiber having good resistance to stretching under high stress and tension. Suitable aramid fibers are available commercially and sold under the trademarks KEVLAR™ and TECHNORA™. Adhesive treating of these cords may be effected using an RFL solution, an epoxy solution, and an isocyanate solution with a rubber composition. The nature of the cords and the treating solution, described above, should not be viewed as limiting.

The cloth layer 76 is preferably a canvas made from at least one of 6 nylon, 6,6 nylon, polyester, aramid fiber, or the like. The cloth layer 76 is defined by a warp 80, extending widthwise of the belt, and a weft 82, extending lengthwise of the belt. The warp and weft 80, 82 could each be a filament thread or spun thread made from the fibers, described above for the load carrying cords. For the weft 82, use of woolie nylon thread having good extendability, urethane elastic thread, or a twisted mixture of urethane elastic thread and nylon, is preferred.

The cloth 76 may be plain woven, twill woven, or satin woven.

In a plain woven cloth layer 76, the warp 80 and weft 82 are alternatingly crossed at every intersection in a wave form arrangement. With twill woven or satin woven cloth, the cross over does not occur at every intersection of the warp 80 and weft 82. As a result, there are fewer wave form intersections than with a plain woven cloth, so that the rubber defining the body 62 effectively penetrates between the warp 80 and weft 82 at points of cross over. Direct contact between the warp 80 and weft 82 is reduced, as a result of which belt life may be enhanced.

The cloth layer 76 is preferably treated only with an RFL (resorcin-formalin-latex) solution. The amount of solid, adhered, RFL solution obtained after drying is preferably 30–50 weight percent.

The RFL solid solution is made up of solid RF and latex resin. The resulting amount of solid adhered RFL solution on the cloth layer 76 can be determined by the following formula:

(Cloth layer weight after treatment−cloth layer weight before treatment)/(cloth layer weight before treatment)×100 (%)

The RFL solution is an initial condensate of resorcin and formalin mixed in latex, with the mole ratio of the resorcin and the formalin being 1 to 1 to 3. The weight percent ratio of the initial condensate of resorcin and formalin and the latex is 1 to 1 to 10.

The latex used is at least one of styrene-butadiene-vinylpyridine ternary copolymer, hydrogenated nitrile rubber, chlorosulfonated polyethylene and epichlorohydrine.

The cloth 76 is treated preferably as follows. The cloth 76 is immersed in the RFL solution using a dip treatment performed by squeezing the cloth 76 between a pair of rollers at a squeezing pressure of approximately 0.3 to 0.8 kgf/cm (gauge pressure). The cloth 76 is then dried. Additional RFL solution treatment is carried out until the solid adhered amount of RFL solution is 30 to 50 weight percent.

It has been found that when the RFL solution is less than 30 weight percent, the contacting portions of the warp 80 and weft 82 on the cloth 76 tend to move to expand the openings 84 bounded by the warp 80 and weft 82. The openings 84 between the warp 80 and weft 82 tend to expand, as a result of which the rubber surface 72 becomes exposed, and liable to be contacted directly by, the pulleys 16, 18, 24, 26, around which the belt 60 is trained and driven. On the other hand, when the solid adhered amount of RFL solution exceeds 50 weight percent, the teeth 70 lose their original, desired shape.

The performance of the inventive belt will now be described through testing procedures comparing specific embodiments of the inventive belt and conventional belts.

Inventive Embodiments 1–6

A twill weave canvas cloth was made with a warp density of 180 threads/5 cm and a weft density of 160 threads/5 cm.

The warp consisted of 140 denier 6,6 nylon. The weft consisted of 280 denier 6,6 nylon and 140 denier urethane elastic thread. The cloth was vibrated in water and contracted to about one half of its width at the time of weaving. The resulting cloth was then immersed in the RFL solution shown in Table 1, below, and squeezed by a pair of rollers at 0.5 kgf/cm (gauge pressure). The cloth was then dried and reimmersed in the same RFL solution, squeezed using the same squeezing pressure, dried, and finally completed with the solid adhered amount of RFL solution at 40 weight percent.

TABLE 1

| RFL Ingredients | Weight Parts |
|---|---|
| Resorcin | 10.0 |
| Formalin (37%) | 15.0 |
| Caustic soda | 1.0 |
| Latex | |
| VP latex 40% | 400 |
| CR latex 50% | 400 |
| Water | 1000.0 |
| Total | 1826.0 |

The load carrying cords were ECG-150-3/0 cords made by forming strands using bundled glass fiber filaments of 9 μm diameter. The strands were then immersed in an RFL solution and dried for 2 minutes at 250° C., and then gathered into groups of 3 strands and twisted at 4.0 turns per 10 cm.

The resulting cloth was formed into an endless cylindrical body and was set in a metal mold. An S, Z pair of glass fiber cords was then wound thereon at a tension of 0.9 kg/cord so as to be disposed alternatingly at a pitch of 0.5 mm. A rolled sheet, made of the rubber composition in Table 2, below, was then applied. After vulcanizing through an ordinary press-in vulcanizing method, the vulcanized sleeve was cut to a predetermined width and individual belts formed therefrom.

TABLE 2

| Compounding Agents | Embodiment | | | | | | |
|---|---|---|---|---|---|---|---|
| | 1 | 2 | 3 | 4 | 5 | 6 | 7 |
| EPDM | 30 | 30 | 30 | 30 | 30 | 30 | 30 |
| Natural rubber | 40 | 40 | — | 70 | — | — | 30 |
| SBR 1502 | 30 | 30 | 30 | — | 70 | — | 20 |
| BR | — | — | 30 | — | — | 70 | 20 |
| Zinc white | 5 | 5 | 5 | 5 | 5 | 5 | 5 |
| Stearic acid | 1 | 1 | 1 | 1 | 1 | 1 | 1 |
| Carbon balck FEF | 40 | — | — | — | — | — | — |
| Acetylene black | — | 40 | 40 | 40 | 40 | 40 | 40 |
| Naphthene oil | 15 | 15 | 15 | 15 | 15 | 15 | 15 |
| Vulcanization accelerator MBTS | 1.0 | 1.0 | 1.0 | 1.0 | 1.0 | 1.0 | 1.0 |
| Vulcanization accelerator TMTD | 0.5 | 0.5 | 0.5 | 0.5 | 0.5 | 0.5 | 0.5 |
| Sulfur | 2 | 2 | 2 | 2 | 2 | 2 | 2 |

The resulting belts were STPD type, with 140 teeth, a width of 6.4 mm, and a tooth pitch of 1.5 mm.

It was found that the shape of the belt teeth after molding was precise, with there being substantially no rubber exposed through the openings in the canvas cloth at the surface of the belt teeth.

Testing

To evaluate the characteristics of the belts, various tests were performed, as summarized in Table 3, below, and explained in detail thereafter.

TABLE 3

| | Embodiment | | | | | | |
|---|---|---|---|---|---|---|---|
| | 1 | 2 | 3 | 4 | 5 | 6 | 7 |
| Rubber | EPDM/NR/SBR | EPDM/NR/SBR | EPDM/BR/SBR | EPDM/NR | EPDM/SBR | EPDM/BR | EPDM/NR/BR/SBR |
| Load carrying cords | ECG-150-3/0 | ECG-150-3/0 | ECG-150-3/0 | ECG-150-3/0 | ECG-150-3/0 | ECG-150-3/0 | |
| Tooth cloth | RFL treatment only | RFL treatment only | RFL treatment only | RFL treatment only | RFL treatment only | RFL treatment only | |
| Friction coefficient μ | | | | | | | |
| 25° C. | 1.32 | 1.40 | 1.35 | 1.34 | 1.35 | 1.37 | 1.40 |
| 5° C. | 1.32 | 1.40 | 1.35 | 1.34 | 1.35 | 1.36 | 1.39 |
| −35° C. | 1.30 | 1.35 | 1.32 | 1.30 | 1.30 | 1.33 | 1.36 |
| Gayman twist test (°C.) | | | | | | | |
| 22.5° C. | 169 | 165 | 165 | — | — | — | — |
| 0° C. | 167 | 163 | 162 | — | — | — | — |
| −20° C. | 164 | 162 | 159 | — | — | — | — |
| −30° C. | 161 | 160 | 158 | — | — | — | — |
| Embrittlement temp. (°C.) | −54 | −52 | −65 | — | — | — | — |
| Ozone resistance 50 pphm 20% extension | 240 h no cracking | 240 h no cracking | 240 h no cracking | 240 h no cracking | 240 h no cracking | 240 h no cracking | 240 h no cracking |
| Electrical resistance (Ω) | $5 \times 10^8$ | $1 \times 10^6$ | — | — | — | — | — |
| Tackiness | a little | a little | None | — | — | — | — |

Environmental Temperature and Coefficient of Friction Test

A card was placed on a support table. The belt was laid so that the back/outside surface of the belt faced the card. A load (W) of 1.0 kgf was applied to the belt. The load was connected to a spring scale fixed to the support table. The belt was advanced at a speed of 300 mm/min. The load (F) when the belt started to slip on the card was determined. The coefficient of friction was calculated as F/W. The measurements were taken with a temperature variation of −25° C. to 25° C.

Gayman Twist Test

This test was carried out in accordance with JISK6231.

Ozone Deterioration Test

This test was carried out in accordance with JISK6301.

Splash Check Test of Rubber Powder After Running

The belt was mounted on a two shaft running test machine having two pulleys, each with 90 teeth. The belt was run for 30 hours in an environment at a temperature of 25° C. at a driving pulley speed of 9,000 rpm, with a load of 66.2 W on the driven pulley, and with an initial belt tension of 1.0 kg. The presence or absence of rubber powder splashed from the belt teeth surfaces after 30 hours of running was visually checked.

Tackiness Resistance Test

Ethanol was soaked into a nylon canvas cloth. The nylon canvas cloth was placed on a moving table. The outside surface of the belt was placed against the canvas and a 5 kg. weight in turn placed on the belt. The table was moved reciprocably 50 times a distance of 40 mm. The speed of movement was 300 mm/min., with the nylon canvas cloth thereby being rubbed by the outside surface of the belt. The presence or absence of tackiness on the outside belt surface was then checked.

Water/Oil Resistance Test

Oil water was coated onto the surface of a telephone card and the resulting change in the frictional force between the belt and the telephone card was determined. The test system used was one as shown in FIG. 1, herein, having a lower belt with a width of 6.4 mm and a length of 100 mm. The upper belt had a 6.4 mm width and a 25 mm length. The belts were stacked on a table moving at a speed of 300 mm/second, with the telephone card between the belts. The telephone card was placed with its magnetic surface facing up. A 5 kg weight was placed on the top belt with a fixed spring scale connected to the weight.

Figure 3:
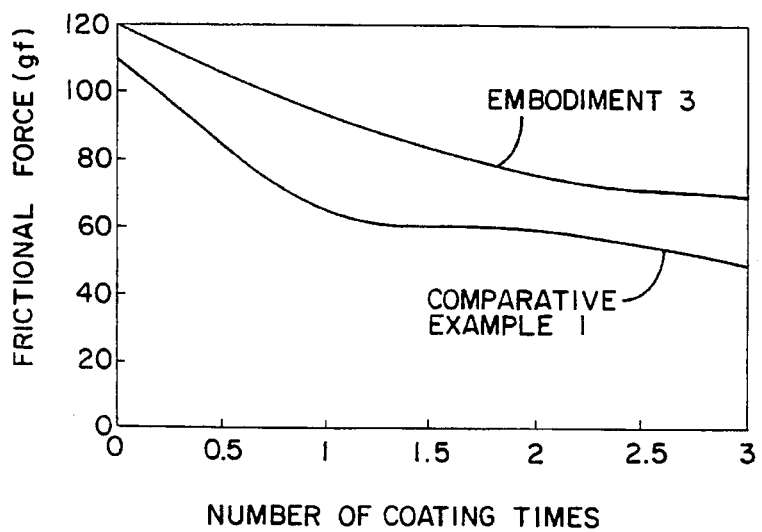
FIG. 3 is a graph of the number of oil coating times on a conveying article versus frictional force generated between the article and belts made according to the present invention and according to the prior art.

An oil water composition, made up of 100 cc of ethanol and 5 g of lard added to 100 cc of artificial sweat, to make it close to the components of a person's sweat and fat, was used. The coating was carried out by completely immersing the telephone card in the oil water and drying it for 20 seconds with a fan. In the table of FIG. 3, the "number of coating times" represents the number of times that the coating was applied and dried, as described above.

During the test procedure, the telephone card coated with the oil water composition was gripped between the upper and lower belts. The upper belt was pulled and the frictional force between the belt and the telephone card was measured. The relationship between the number of coating times and the frictional force is shown in FIG. 3.

Comparative Example 1

For the cloth layer, the same untreated canvas cloth was used as for the inventive embodiment 1 and immersed in the RFL solution shown in Table 2. This treatment was carried out without any squeezing pressure applied. The cloth was then dried to produce a canvas cloth having a solid adhered amount of RFL solution of 25 weight percent.

The rubber composition shown in Table 4, below, was used for the teeth and the back/outside part of the belt. The manufacturing method, including the formation of the load carrying cords, was the same as that described for inventive embodiments 1–6. However, the tooth pitch was set to 2.032 mm.

TABLE 4

|  | (weight parts) | | |
| --- | --- | --- | --- |
|  | Comparative Example | | |
| Compounding Agents | 1 | 2 | 3 |
| Chloroprene | 100 | 100 | — |
| Natural rubber | — | — | 70 |
| SBR 1502 | — | — | 30 |
| MgO | 4 | 4 | — |
| Acetylene black | 40 | 40 | 40 |
| Plasticizer | 15 | 35 | — |
| Stearic acid | 1 | 1 | 1 |
| ZnO | 5 | 5 | 5 |
| Naphthene oil | — | — | 15 |
| Vulcanization accelerator MBTS | — | — | 1 |
| Vulcanization accelerator TMTD | — | — | 0.5 |
| Ethylene thiorea | 0.25 | 0.25 | — |
| Sulfur | 1 | 1 | 2 |

The performance characteristics of these belts are shown in Table 5, below.

TABLE 5

|  | Comparative Example | | |
| --- | --- | --- | --- |
|  | 1 | 2 | 3 |
| Rubber | CR | CR | NR/SBR |
| Load Carring cords | ECG-150-3/0 | ECG-150-3/0 | ECG-150-3/0 |
| Tooth Cloth | RFL treatment only | RFL treatment only | RFL treatment only |
| Friction coefficient μ | | | |
| 25° C. | 1.17 | 1.15 | — |
| 5° C. | 1.13 | 1.00 | — |
| −35° C. | 0.98 | 0.80 | — |
| Gayman twist test (°C.) | | | |
| 22.5° C. | 169 | — | — |
| 0° C. | 165 | — | — |
| −20° C. | 160 | — | — |
| −30° C. | 156 | — | — |
| Embrittlement temp. (°C.) | −41 | — | — |
| Ozone resistance 50 pphm 20% extension | 240 h no cracking | 240 h no cracking | 24 h C-5 |
| Electrical resistance (Ω) | — | — | — |
| Tackiness | none | none | none |

Analysis of Test Results

The tests demonstrate that there is no substantial change in the frictional coefficient for the inventive belt when used in either high or low temperature environments. There is especially little decrease in the frictional coefficient at low temperatures.

It can also be seen that the inventive belt has good resistance to ozone and that the frictional force reduction of the belt when exposed to oil water is small compared to the comparative example tested.

No rubber powder was found with the inventive belt after running. However, the comparative example belt had noticeable rubber powder splashed from the teeth after running. The belt in the comparative example did have a good tooth shape after molding, however, the surface adhesion rate of rubber on the belt tooth surface was approximately 10%. This adhesion rate is a value obtained by dividing the area over which the rubber is exposed through openings in the canvas cloth by the total area.

The foregoing disclosure of specific embodiments is intended to be illustrative of the broad concepts comprehended by the invention.

We claim:

1. A toothed belt comprising:
a body having a length, laterally spaced sides, an inside and an outside, and defining a plurality of teeth spaced in a lengthwise direction on one of the inside and the outside of the body,
said body defined at least in part by a rubber composition comprising at least an ethylene propylene diene monomer (EPDM) and a diene rubber; and
a cloth layer on the teeth on the one of the inside and outside of the body, said cloth layer being treated with a resorcin-formalin-latex solution.

2. The toothed belt according to claim 1 in combination with a pulley to engage the teeth, wherein the one of the inside and outside of the body is defined by rubber and the cloth layer prevents direct contact between the pulley and the rubber on the one of the inside and outside of the body.

3. The toothed belt according to claim 2 wherein the cloth layer is treated with only a resorcin-formalin-latex solution.

4. The toothed belt according to claim 3 wherein there are a plurality of load carrying cords embedded in and extending lengthwise of the body.

5. The toothed belt according to claim 4 wherein the body has an outside part in which the load carrying cords are embedded and the outside part of the body and teeth both comprise said rubber composition.

6. The toothed belt according to claim 1 wherein the toothed belt is a first toothed belt, there being in combination with the first toothed belt a second toothed belt that is the same as the first toothed belt and means for mounting the first and second toothed belts for movement in endless paths wherein the other of the inside and outside of the bodies on the first and second toothed belts are in close proximity to frictionally convey a flat object therebetween as the first and second toothed belts are moved in the endless paths.

7. The toothed belt according to claim 1 wherein the rubber composition comprises ethylidene norbornane and the EPDM has an iodine value of at least 10.

8. The toothed belt according to claim 1 wherein the diene rubber is at least one of a) natural rubber, b) BR (butadiene rubber), c) SBR (styrene butadiene rubber), d) NBR (nitrile rubber), e) HNBR (hydrogenated nitrile rubber), and f) chloroprene rubber.

9. The toothed belt according to claim 1 wherein the cloth layer comprises 30–50 wt. percent of solid resorcin-formalin-latex solution.

10. The toothed belt according to claim 1 wherein the rubber composition comprises 20–70 weight parts of EPDM.

11. The toothed belt according to claim 1 wherein the rubber composition comprises 25–50 weight parts of EPDM.

12. The toothed belt according to claim 7 wherein the EPDM has an iodine value of at least 15.

13. The toothed belt according to claim 7 wherein the EPDM has an iodine value of at least 20.

14. The toothed belt according to claim 1 wherein the rubber composition is formed using a compounding agent comprising at least one of a) carbon block, b) zinc white, c) stearic acid, d) a plasticizer, and e) an antioxidant.

15. The toothed belt according to claim 1 wherein the rubber composition is formed using a vulcanizing agent that is at least one of sulfur and an organic peroxide.

16. The toothed belt according to claim 4 wherein the load carrying cords comprise filaments of 5–9 μm diameter of at least one of E glass and high strength glass treated with a protective agent.

17. The toothed belt according to claim 16 wherein the protective agent comprises at least one of a rubber composition and an RFL solution.

18. The toothed belt according to claim 4 wherein the load carrying cords comprise twisted 0.50–2.5 denier filaments of para aramid fiber treated with an adhesive comprising at least one of a) an RFL solution, b) an epoxy solution, and c) an isocyanate solution with a rubber composition.

19. The toothed belt according to claim 1 wherein the cloth layer comprises at least one of 6 nylon, 6,6 nylon, polyester, and aramid fiber.

20. The toothed belt according to claim 19 wherein the cloth layer comprises a warp and a weft and the warp and weft each comprise at least one of a filament thread and a spun thread.

21. The toothed belt according to claim 19 wherein the cloth layer comprises a warp and a weft and the weft comprises at least one of woolie nylon thread and urethane elastic thread.

22. The toothed belt according to claim 1 wherein the cloth layer comprises one of a plain weave, twill weave, and satin weave.

23. A toothed belt comprising:

a body having a length, laterally spaced sides, an inside and an outside, and defining a plurality of teeth spaced in a lengthwise direction on one of the inside and the outside of the body, said body defined at least in part by a rubber composition comprising a) ethylene propylene diene monomer (EPDM), b) a diene rubber that comprises at least one of i) natural rubber, ii) BR Coutadiene rubber), iii) SBR (styrene butadiene rubber), iv) NBR (nitrile rubber), v) HNBR (hydrogenated nitrile rubber), and vi) chloroprene rubber, and c) ethylidene norbornane; and a cloth layer on the teeth on the one of the inside and outside of the body.

24. The toothed belt according to claim 23 wherein the cloth layer is treated with a resorcin-formalin-latex solution.

25. The toothed belt according to claim 23 wherein there are a plurality of load carrying cords embedded in the body.

26. The toothed belt according to claim 25 wherein the body has an outside part in which the load carrying cords are embedded and the outside part of the body and teeth both comprise said rubber composition.

27. The toothed belt according to claim 23 wherein the EPDM has an iodine value of at least 10.

28. The toothed belt according to claim 24 wherein the cloth layer comprises 30–50 wt. percent of solid resorcin-formalin-latex solution.

* * * * *